United States Patent
Nilssen

Patent Number: 5,374,874
Date of Patent: Dec. 20, 1994

[54] ELECTRONIC BALLAST WITH CREST FACTOR CONTROL

[76] Inventor: Ole K. Nilssen, Caesar Dr., Barrington, Ill. 60010

[21] Appl. No.: 408,270

[22] Filed: Sep. 18, 1989

Related U.S. Application Data

[63] Continuation-in-part of Ser. No. 300,579, Jan. 23, 1989, abandoned, which is a continuation-in-part of Ser. No. 250,990, Sep. 29, 1988, abandoned, which is a continuation-in-part of Ser. No. 693,188, Jan. 22, 1985, abandoned, which is a continuation-in-part of Ser. No. 454,425, Feb. 22, 1983, abandoned, said Ser. No. 300,579, and a continuation-in-part of Ser. No. 153,572, is a continuation of Ser. No. 30,554, Mar. 27, 1987, abandoned, which is a continuation of Ser. No. 693,188, Jan. 22, 1985, abandoned, which is a continuation-in-part of Ser. No. 454,425, Feb. 22, 1983, abandoned.

[51] Int. Cl.$^5$ .................................. H05B 41/29
[52] U.S. Cl. ......................... 315/219; 315/247; 315/DIG. 7
[58] Field of Search ........... 315/219, 247, DIG. 7, 315/223, 283, 307, 240, 291, 297

[56] References Cited
U.S. PATENT DOCUMENTS

| | | | |
|---|---|---|---|
| 4,251,752 | 2/1981 | Stolz | 315/DIG. 7 |
| 4,560,908 | 12/1985 | Stupp et al. | 315/219 |
| 4,954,754 | 9/1990 | Nilssen | 315/219 |
| 5,041,766 | 8/1991 | Fiene et al. | 315/219 |
| 5,068,573 | 11/1991 | Bruning et al. | 315/DIG. 7 |

Primary Examiner—Robert J. Pascal
Assistant Examiner—Tan Dinh

[57] ABSTRACT

A self-oscillating half-bridge inverter is powered from a power-line-operated rectifier means providing a DC supply voltage having a relatively high crest-factor. The inverter is loaded by way of a series-tuned high-Q LC circuit connected across this DC voltage. A pair of fluorescent lamps is series-connected across the tank-capacitor of the LC circuit. Also connected across the DC voltage is an arrangement of three energy-storing capacitors charged in series and discharged in parallel. The crest-factor of the current flowing through the fluorescent lamps is substantially lower than the crest-factor of the DC supply voltage.

20 Claims, 3 Drawing Sheets

ELECTRONIC BALLAST WITH CREST FACTOR CONTROL

BACKGROUND OF THE INVENTION

RELATED APPLICATIONS

Instant application is a continuation-in-part of application Ser. No. 07/300,579 filed Jan. 23, 1989 and now abandoned; is also a continuation-in-part of Ser. No. 07/250,990 filed Sep. 29, 1988, now abandoned; which is a continuation-in-part of Ser. No. 06/693,188 filed Jan. 22, 1985, now abandoned; which is a continuation-in-part of Ser. No. 06/454,425 filed Feb. 22, 1983, now abandoned.

Application Ser. No. 07/300,579 is also a continuation-in-part of Ser. No. 07/153,572 filed Feb. 8, 1988 and now abandoned; which is a continuation of Ser. No. 07/030,554 filed Mar. 27, 1987 and now abandoned; which is a continuation of Ser. No. 06/693,188 filed Jan. 22, 1985, now abandoned; which is a continuation-in-part of Ser. No. 06/454,425 filed Feb. 22, 1983, now abandoned.

FIELD OF THE INVENTION

The present invention relates to power-factor-corrected electronic ballasts for gas discharge lamps, particularly of a type having means for controlling lamp current crest factor.

SUMMARY OF THE INVENTION

OBJECTS OF THE INVENTION

One object of the present invention is that of providing for cost-effective ballasting means for gas discharge lamps.

This as well as other more specific objects, features and advantages of the present invention will become apparent from the following description and claims.

BRIEF DESCRIPTION

A self-oscillating half-bridge inverter is powered from a power-line-operated rectifier means providing across a pair of DC terminals a DC voltage having a relatively high degree of voltage ripple. The inverter is loaded via a series-tuned high-Q LC circuit connected across this DC voltage. A pair of fluorescent lamps is series-connected across the tank-capacitor of the LC circuit.

Connected across the DC terminals is an arrangement of three energy-storing capacitors; which capacitors are charged in series and discharged in parallel. This arrangement makes the current drawn from the power line have relatively high power factor and low harmonic distortion.

Charging current for the three energy-storing capacitors is derived from the high frequency current flowing through the LC circuit; and charging occurs only during periods near the peak of the power line voltage.

The magnitude of the DC voltage on each of the three energy-storing capacitors is kept a level equal to about 30%–50% of the peak of the power line voltage.

An effect of charging the energy-storing capacitors from the current flowing through the LC circuit is that of improving the crest factor of the current flowing through the fluorescent lamps by a significant amount; which crest factor would otherwise have been unacceptably high due to the high ripple voltage on the DC supply voltage.

The inverter has two bipolar transistors, each driven by an associated saturable current transformer that provides for a transistor ON-time dependent upon the magnitude of an associated bias voltage.

One of the transistors has a control arrangement connected in circuit with its associated saturable transformer and operative to control the magnitude of its associated bias voltage. As the magnitude of this bias voltage is controlled, the magnitude of the voltage across the tank-capacitor, as well as of the current available therefrom, is correspondingly controlled.

The magnitude of the bias voltage is automatically controlled such that: (a) with the lamps not-yet-ignited, the magnitude of the voltage across the tank-capacitor is maintained at a level somewhat higher than normal lamp operating voltage, except that for a brief period (10–100 milli-seconds) once each second or so the magnitude is increased to a level high enough to cause lamp ignition; (b) after the lamps have ignited, the magnitude of the lamp current is limited to an adjustably preset level; and (c) the magnitude of any ground-fault current is limited to a level considered safe from shock hazard.

DESCRIPTION OF THE PREFERRED EMBODIMENT

Figure 1:
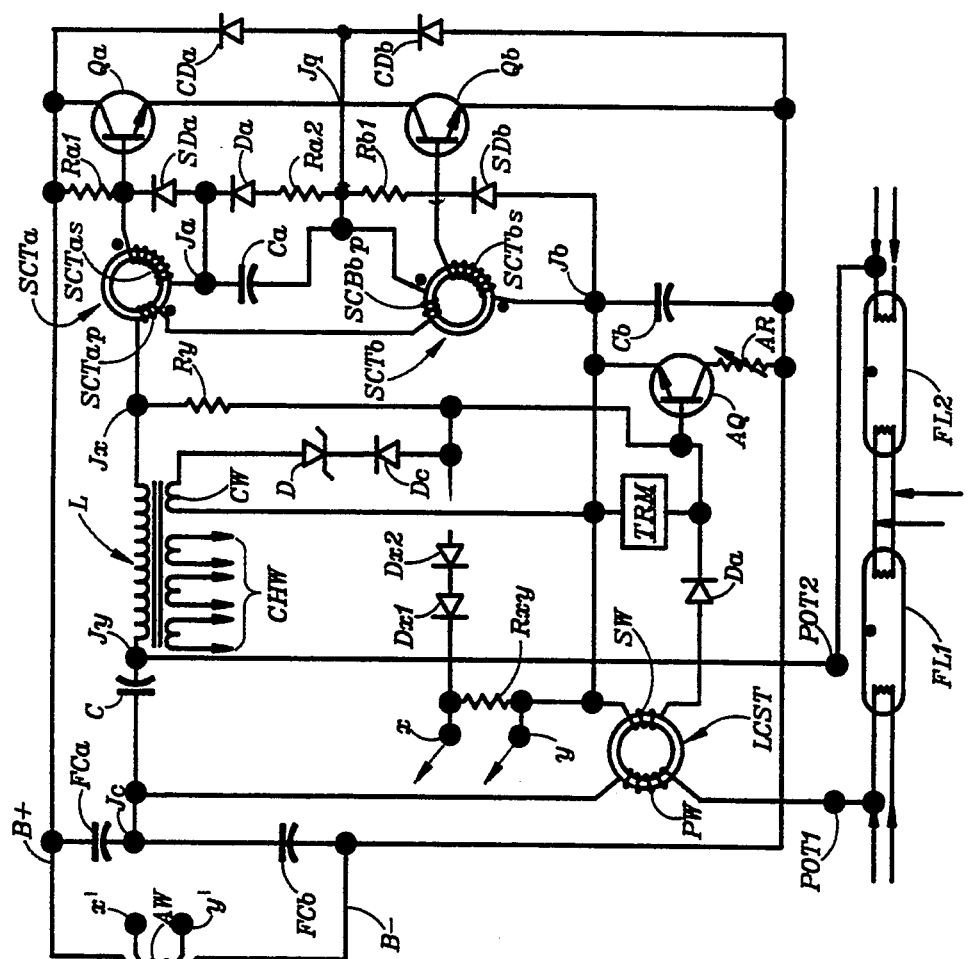
FIG. 1 provides a basic electrical circuit diagram of an electronic ballast wherein the ballast function is electronically controlled.

Details of Construction of FIG. 1 Circuit

In FIG. 1, a source S of ordinary 120 Volt/60 Hz (or 277 Volt/60 Hz) power line voltage is applied to power input terminals PITa and PITb; which terminals, in turn, are connected with a bridge rectifier BR. The DC output from bridge rectifier BR is applied to a DC+ terminal and a DC— terminal, with the DC+ terminal being of positive polarity. A high-frequency filter capacitor HFFC is connected between the DC+ terminal and the DC— terminal. A first winding W1 of an EMI suppression inductor SI is connected between the DC+ terminal and a B+ bus; and a second winding W2 of EMI suppression inductor SI is connected between the DC— terminal and a B— bus.

An auxiliary winding AW is wound on EMI suppression inductor SI; which auxiliary winding has output terminals x' and y'.

A filter capacitor FCa is connected between the B+ bus and a junction Jc; a filter capacitor FCb is connected between junction Jc and the B— bus. A switching transistor Qa is connected with its collector to the B+ bus and with its emitter to a junction Jq; a switching transistor Qb is connected with its collector to junction Jq and with its emitter to the B— bus. A commutating diode CDa is connected between the B+ bus and junction Jq, with its cathode connected with the B+ bus; a commutating diode CDb is similarly connected between junction Jq and the B— bus. A saturable current transformer SCTa has a secondary winding SCTas connected between the base of transistor Qa and a junction Ja; a saturable current transformer SCTb has a secondary winding SCTbs connected between the base of transistor Qb and a junction Jb. Saturable current transformers SCTa and SCTb, respectively, have primary windings SCTap and SCTbp; which primary windings are series-connected between junction Jq and a junction Jx. A resistor Ra1 is connected between the collector and the base of transistor Qa; a resistor Rb1 is connected between the collector and the base of transistor Qb. A capacitor Ca is connected between junction Ja and the emitter of transistor Qa; a capacitor Cb is connected between junction Jb and emitter of transistor Qb. A diode Da is connected with its cathode to junction Ja and, by way of a leakage resistor Ra2, with its anode to the emitter of transistor Qa. A shunt diode SDa is connected between the base of transistor Qa and junction Ja, with its anode connected with junction Ja; a shunt diode SDb is similarly connected between the base of transistor Qb and junction Jb. An auxiliary transistor AQ is connected with its emitter to junction Jb and with its collector to the B— bus by way of an adjustable resistor AR. A temperature-responsive means TRM is connected between the base and the emitter of transistor AQ. A resistor Ry is connected between junction Jx and the base of transistor AQ.

A tank inductor L is connected between junction Jx and a junction Jy; and a tank capacitor C is connected between junctions Jy and Jc. A power output terminal POT1 is connected with junction Jc by way of a primary winding PW of a lamp current sensing transformer LCST; another power output terminal POT2 is connected directly with junction Jy. First and second fluorescent lamps FL1 and FL2 are series-connected between power output terminals POT1 and POT2. Tank inductor L has three cathode heater windings CHW; which are connected with the cathodes of fluorescent lamps FL1 and FL2.

Tank inductor L also has a control winding CW connected between junction Jb and the anode of a Zener diode Z, whose cathode is connected with the cathode of a diode Dc, whose anode is connected with the base of transistor AQ.

A secondary winding SW of transformer LCST is connected between the emitter of auxiliary transistor AQ and the anode of diode Da, whose cathode is connected with the base of transistor AQ. A terminal y is connected with junction Jb. A terminal x is connected with the cathode of a diode Dx1, whose anode is connected with the cathode of a diode Dx2, whose anode is connected with the base of transistor AQ. A resistor Rxy is connected between terminals x and y; which terminals are respectively connected with terminals x' and y' of auxiliary winding AW of suppression inductor SI.

Details of Operation of FIG. 1 Circuit

Figure 3:
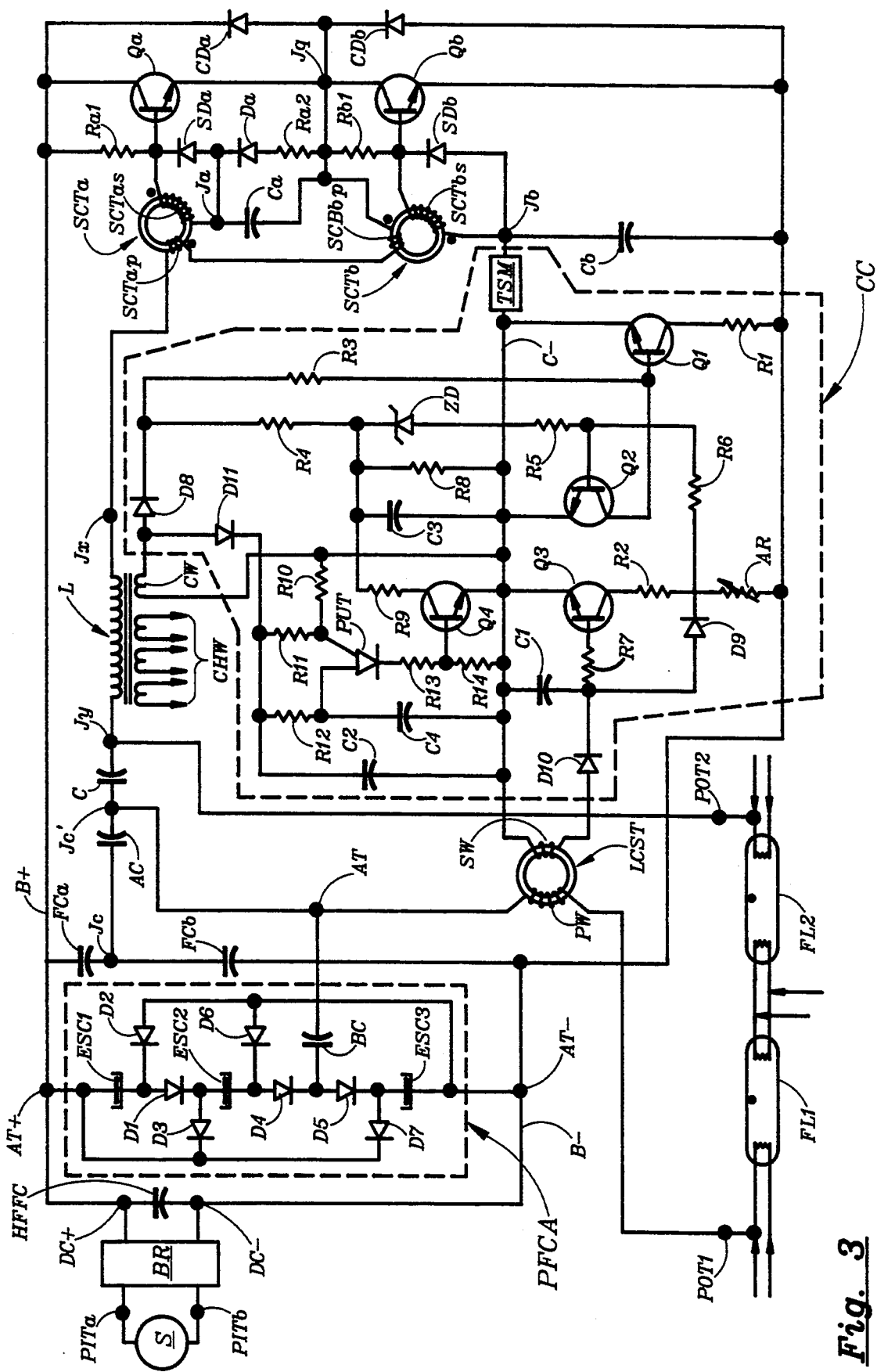
FIG. 3 provides a basic electrical circuit diagram of the preferred embodiment of the invention.

The basic operation of the half-bridge inverter of FIG. 1 is conventional and is explained in conjunction with FIG. 3 of U.S. Pat. No. 4,307,353 to Nilssen.

For a given magnitude of the DC supply voltage, due to the effect of the high-Q LC circuit, the magnitude of the current provided to the fluorescent lamp load (or to any other load presented to the output) is a sensitive function of the frequency and the waveshape of the inverter's output voltage; which output voltage is a squarewave voltage of controllable frequency and with peak-to-peak magnitude about equal to that of the instantaneous magnitude of the DC voltage present between the B— bus and the B+ bus.

The frequency of the inverter's squarewave output voltage is a sensitive function of the natural resonance frequency of the high-Q LC circuit as well as of the duration of the forward conduction period (i.e., the ON-period) of the two inverter switching transistors; which duration, in turn, is a sensitive function of the saturation characteristics of saturable current transformers SCTa and SCTb as combined with the magnitude of the bias voltages present on capacitors Ca and Cb. That is, the duration of the forward conduction period (the ON-time) of each switching transistor is determined by the volt-second product sustainable by its associated saturable current transformer as well as by the magnitude of the negative bias on capacitors Ca and Cb: the higher the volt-second product available before saturation, the longer the ON-time; the higher the negative bias on the Ca/Cb capacitors, the shorter the ON-time.

In the circuit arrangement of FIG. 1, the magnitude of the negative voltage on capacitors Ca and Cb is determined by the magnitude of the current provided to the bases of transistors Qa and Qb, less any current drained away through resistors R2a and AR, all respectively. (Of course, a small amount of current is also drained away from bias capacitors Ca and Cb by resistors Ra1 and Rb1/Ry, respectively. However, this amount of charge leakage is in most situations negligible. Resistors Ra1 and Rb1/Ry are principally used for getting the inverter to initiate oscillation.)

The magnitude of the base current provided to each transistor is directly proportional to the magnitude of the current flowing through the primary windings of saturable current transformers SCTa and SCTb. Thus, assuming transistor AQ to be conducting, for given values of resistors R2a and AR: the higher the magnitude of the inverter's output current, the higher the magnitude of the negative voltage on capacitors Ca and Cb.

In other words, again assuming transistor AQ to be conducting and given values of resistors R2a and AR, the circuit of FIG. 1 provides for a high degree of automatic regulation of the magnitude of the inverter's output current. Moreover, by selecting a suitable resistance value for resistor Ra2, and assuming transistor AQ to be conducting, the magnitude of the inverter's output current may be adjusted by adjusting the resistance value of AR: a relatively low resistance value leads to an inverter output current of relatively high magnitude; a relatively high resistance value leads to an inverter output current of relatively low magnitude.

The higher the magnitude of the negative voltage on each bias capacitor, the higher the magnitude of the voltage that has to be provided form the secondary winding of each saturable current transformer; which, in turn, leads to a correspondingly shorter period before saturation is reached. Thus, as the magnitude of the negative bias on each bias capacitor in increased, the duration of each transistor's forward conduction period (ON-time) is decreased; which, in turn, leads to a reduction in the magnitude of the inverter's output current in comparison with what it otherwise would have been.

Whereas the base current provided to each transistor has to flow from its associated bias capacitor, the reverse or reset current provided from each of the saturable current transformer's secondary windings does not flow from the bias capacitor, but rather flows in a separate path through the reverse shunt diode (SDa or SDb) shunting the secondary winding of each saturable current transformer.

More particularly, the circuit and control arrangement of FIG. 1 operates as follows.

Shortly after power is applied at power input terminals PIT1/PIT2, the inverter starts to oscillate at a frequency near the natural self-resonance frequency of the LC circuit. The current provided through resistor Ry flows into the base of transistor AQ and makes it conductive, thereby forming a leakage path for the (negative) charge developing on capacitor Cb due to the base current flowing into the base of transistor Qb. (Of course, the combination of diode Da and resistor Ra2 forms a leakage path for the charge developing on capacitor Ca.)

With the fluorescent lamps non-connected or otherwise non-functional, the magnitude of the high-frequency (30 kHz or so) voltage developing across the tank-capacitor rapidly increases to a point where current starts flowing from control winding WC, through Zener diode Z and rectifier diode Dc; thereby drawing current away from the base of transistor AQ; thereby, in turn, (i) making transistor AQ non-conductive, (ii) stopping the leakage of charge from capacitor Cb, (iii) increasing the magnitude of the (negative) bias voltage on capacitor Cb, (iv) reducing the ON-time of transistor Qb, and (v) decreasing the magnitude of the inverter's output current. As an overall net result, the magnitude of the high-frequency voltage across the tank-capacitor will be manifestly prevented from exceeding that level which corresponds to a voltage-magnitude across the tank-inductor that, in turn, causes Zener diode Z to conduct, thereby to draw base current away from transistor AQ.

In fact, in the absence of lamp loading, by virtue of the above-indicated control procedure and by suitable choice of the Zener voltage of Zener diode Z, the magnitude of the high-frequency voltage developing across the tank-capacitor will be manifestly limited to (and held to) a level that is exactly suitable for proper starting of the fluorescent lamps.

With functional fluorescent lamps connected, the operation will proceed as indicated above, but only until the lamps ignite; which they will do within about one second after having been connected.

As soon as the lamps ignite, the magnitude of the voltage across tank-capacitor C (as well as across tank-inductor L) decreases to a level too low to cause Zener diode Z to conduct. Moreover, lamp current starts to flow; which lamp current flows through primary winding PW of transformer LCST, thereby providing positive base current to transistor AQ. As an overall net result, transistor AQ will now become conductive.

As long as transistor AQ is conductive, the fluorescent lamps will be powered in a normal manner; and the magnitude of the lamp current flowing will depend on the particular setting of adjustable resistor AR. Thus, adjustable resistor AR constitutes a means for light output adjustment or dimming.

In case of a ground-fault condition—which typically might occur if fluorescent lamp FL2 were to be connected at its one end with power output terminal POT2 while a ground-connected person held onto the lamp's terminals at its other end—high-frequency current would flow out from the ballast at terminal POT2, through the lamp and person to ground, and then eventually back to the ballast by way of one or both of the power input terminals (PIT1/PIT2. Thus, this ground-fault current would have to flow through one or both of windings W1 and W2 of suppression inductor SI. As a result, a corresponding current would flow out of auxiliary winding AW and into terminals x and y. By way of series-connected diodes Dx1 and Dx2, this current will subtract from the base current of transistor AQ, thereby rendering transistor AQ non-conductive, thereby manifestly limiting the magnitude of this ground-fault current to a level considered by authoritative entities, such as Underwriters Laboratories, Inc. of Northbrook, Ill., as being substantially non-hazardous.

Figure 2:
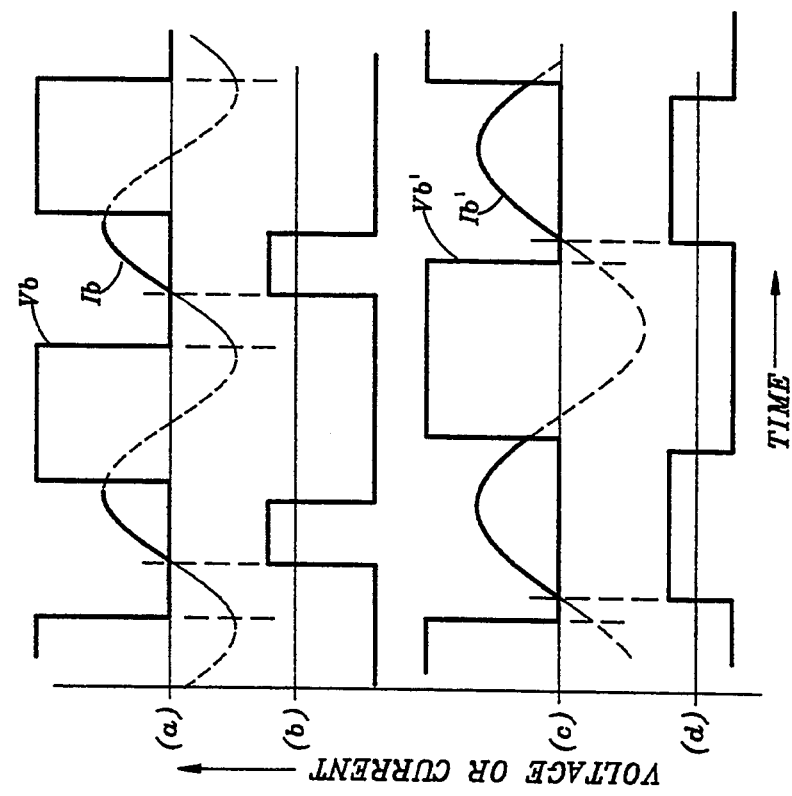
FIG. 2 illustrates waveshapes of various high frequency voltages and currents present within the circuit of FIG. 1 during different modes of operation.

FIG. 2 depicts various voltage and current waveforms associated with the circuit of FIG. 1.

For a situation with no loading presented to the high-Q LC circuit—that is, with the lamps disconnected, or before the lamps have ignitied—FIG. 2a shows the collector-to-emitter voltage Vb of transistor Qb and the corresponding inverter output current Ib. The part of Ib actually flowing through transistor Qb in the forward direction is shown in heavy solid line, the part of Ib flowing through commutating diode CDb is showed in light solid line, and the part of Ib flowing through either Qa or CDa is shown in light dashed line.

FIG. 2b shows the base-emitter voltage of transistor Qb as it corresponds to the waveforms of FIG. 2a.

For a situation where the LC circuit is substantially fully loaded by the two fluorescent lamps, FIG. 2c shows the collector-to-emitter voltage Vb' of transistor Qb and the corresponding inverter output current Ib'. The part of Ib' actually flowing through transistor Qb in the forward direction is shown in heavy solid line, the part of Ib' flowing through commutating diode CDb is showed in light solid line, and the part of Ib' flowing through either Qa or CDa is shown in light dashed line.

FIG. 2d shows the base-emitter voltage of transistor Qb as it corresponds to the waveforms of FIG. 2c.

Additional Comments re FIG. 1 Circuit a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

b) The instantaneous peak-to-peak magnitude of the squarewave output voltage provided by the half-bridge inverter between junctions Jq and Jc is substantially equal to the instantaneous magnitude of the DC supply voltage.

c) Saturable current transformers SCTa and SCTb require only a miniscule amount of voltage across their primary windings. Hence, the magnitude of the voltage-drop between junctions Jq & Jx is substantially negligible, and the inverter's full output voltage is therefore effectively provided across the LC circuit, which consists of tank capacitor C and tank inductor L.

d) In FIG. 2, the inverter frequency associated with the waveforms of FIGS. 2a and 2b is somewhat higher than that associated with FIGS. 2c and 2d. Correspondingly, current Ib is nearly 90 degrees out of phase with the fundamental frequency component of voltage Vb, while current Ib' is almost in phase with voltage Vb'.

e) In the situation associated with the waveform of FIG. 2b, the magnitude of the bias voltage on bias capacitor Ca and Cb is about three times higher than it is in the situation associated with the waveform of FIG. 2d. Correspondingly, the duration of the transistor ON-time in the situation associated with FIG. 2d is about twice that of the transistor ON-time in the situation associated with the waveform of FIG. 2b.

f) As may be noticed in FIG. 2a, transistor Qb ceases to conduct in its forward direction while a substantial amount of current is still flowing in the forward direction. After transistor Qb has ceased to conduct, the forward-flowing current will continue to flow until the energy in the tank inductor has dissipated itself.

However, the current will continue its flow through commutating diode CDa, thereby discharging its energy into the DC power supply.

g) Forward conduction of a transistor is defined as current flowing, with the aid of forward base drive current, directly between the collector and the emitter; which, in case of transistor Qb for, instance, means that forward current is defined as positive current flowing from its collector to its emitter while drive current is being provided to its base.

A transistor's ON-time is defined as the period during which it conducts current in the forward direction.

h) For the situations depicted in FIG. 2, the magnitude of the negative bias voltage is substantially the same on both bias capacitors; which implies that the resistance value of adjustable resistor AR (as combined with the effect of transistor AQ, which is conducting in an intermittent manner) is set to be effectively the same as that of resistor Ra2 as combined with its associated diode Da.

However, there is no need for these two resistance values to be the same: quite the contrary. A wide range of inverter power output adjustment is in fact attained by way of adjusting only one of the two effective resistance values—i.e., AR.

With the two resistance values being effectively different, the durations of the ON-times of the associated transistors will be correspondingly different. For instance: the smaller the resistance value of AR, the longer the ON-time associated with transistor Qb; the larger the resistance value of AR, the shorter the ON-time associated with transistor Qb.

i) In FIG. 2 it is noted that the fundamental frequency of the waveforms depicted in FIGS. 2a and 2b is higher by a certain factor as compared with the frequency associated with the waveforms of FIGS. 2c and 2d; yet the indicated duration of transistor ON-time associated with the waveforms of FIGS. 2a and 2b is shorter by a much larger factor as compared with the indicated duration of transistor ON-time associated with the waveforms of FIGS. 2c and 2d.

In fact, when the transistor ON-time is shortened by a given proportion, the fundamental frequency of the inverter's output voltage increases by a much smaller proportion. In instant case, with each transistor's ON-time shortened by a factor of about two, the inverter frequency increased only by a factor of less than 1.2: from about 30 kHz to just over 35 kHz.

j) The time constant associated with each bias capacitor and its associated leakage resistance means is normally longer than a complete cycle of the high frequency inverter output voltage, and it is typically on the order of several such complete cycles.

For instance, for a situation where the power line input voltage is 120 Volt/60 Hz, the frequency of the inverter output voltage/current is on the order of 30 kHz, and the total inverter power output falls in the range between 10 and 100 Watt, the values of bias capacitors Ca and Cb might reasonably be in the range from one to 100 micro-Farad, the value for leakage resistor Ra2 might reasonably be in the range between 10 and 100 Ohm, and adjustable resistor AR might reasonably be adjustable over a range between 5 and 100 Ohm.

Thus, in general, the magnitude of the bias voltage on the bias capacitors is responsive to the average magnitude of the inverter's output current—normally as averaged over at least a full cycle of this output current.

k) In case of excessive temperatures, thermally responsive means TRM acts to reduce power output from the inverter by way of removing base current from transistor AQ.

l) In the circuit arrangement of FIG. 1, by properly selecting the operating frequency and the various components affecting the magnitude of the maximum current available from power output terminal POT2 (in the absence of any lamp current flowing through the primary winding PW of transformer LCST)—which components are principally Ra2 and Ry—the maximum magnitude of the current available from power output terminal POT2 may be limited to a level that would be considered substantially non-hazardous with respect to electric shock potential.

The maximum magnitude of current considered substantially non-hazardous with respect to electric shock potential increases with frequency: being about 30 milli-Ampere RMS at 10 kHz; 90 milli-Ampere RMS at 30 kHz; and 120 milli-Ampere RMS at 40 Kz.

Thus, by properly selecting the resistance values of resistors Ra2 and Ry, protection from serious shock hazard due to a ground-fault situation is provided.

A ground-fault situation occurs whenever a ground-connected person holds onto the terminals at one end of a fluorescent lamp while inserting the other end into the lamp socket connected with power output terminal POT2. In that case, a ground-fault current will flow through the person, to ground, and from ground to the power line conductors, and therefrom back to the inverter by way of power input terminals PIT1/PIT2 and rectifier means BR. However, as long as no lamp current flows through primary winding PW of transformer LCST, the maximum current that can be delivered from power output terminal POT2 is—at the 30–35 kHz frequency associated with the circuit arrangement of FIG. 1—limited to being essentially non-hazardous with respect to producing an electric shock.

The POT2 terminal is designated the "hot" terminal; while the POT1 terminal is designated as the "cold" terminal. If a ground-connected person were to touch the POT1 or the "cold" terminal he would normally not be exposed to a shock hazard.

m) On the other hand, if the frequency of the inverter means is chosen to be relatively low, thereby reducing the magnitude of non-hazardous ground-fault current, electric shock hazard is never-the-less prevented by means of the auxiliary winding AW on suppression inductor SI. That is, the circuit arrangement of FIG. 1 provides for a redundant shock protection feature.

More particularly, in the event of a ground-fault situation, the negative base current provided to transistor AQ (due to the output from auxiliary winding AW) is sufficient to make transistor AQ non-conductive to a degree sufficient to cause the magnitude of the current available from power output terminal POT2 to be limited to such a degree as not to exceed the maximum non-hazardous magnitudes for ground-fault current.

n) With power input terminals PIT1 and PIT2 connected with an ordinary electric utility power line, all electrical parts of the circuit arrangement of FIG. 1 are effectively in connection earth ground by way of those power input terminals o) Although not expressly shown in FIG. 1, it is emphasized that fluorescent lamps FL1 and FL2 are connected with terminals POT1 and POT2 by way of lamp socket means of a type that has electrical terminal means that are non-accessible to a person's fingers or the like. However, the terminal means of the fluorescent lamps are such that a person may touch them directly, provided they are not inserted into their sockets.

Thus, in a situation where the circuit arrangement of FIG. 1 is used as a fluorescent lamp ballasting means, and under otherwise ordinary circumstances, the only way that a person is able to get exposed to a ground-fault current from the circuit arrangement of FIG. 1 is by holding on to the terminals at one of end of a fluorescent lamp while inserting the other end into a lamp socket connected with the POT2 or the "hot" terminal.

p) In the circuit arrangement of FIG. 1 there are two distinctly different kinds of current-magnitude-limiting provided. One is the ordinary kind associated with the natural characteristics of a series-excited parallel-loaded resonant LC circuit; another is due to the action of the control circuit associated with auxiliary transistor AQ.

The former is the principal means for limiting the lamp current; the latter is the principal means for limiting the output current in the absence of proper circuit loading.

q) Due to basic factors related to magnetic hysteresis and leakage iductance, lamp current sensing transformer LCST requires the lamp current to have a certain minimum magnitude before producing an output signal of magnitude adequate to cause auxiliary transistor AQ to become conductive. Hence, there is a minimum threshold level automatically built into the control means used for sensing lamp current. This threshold level may readily be changed, for instance by changing the number of turns on primary winding PW, or by placing a shunting impedance across secondary winding SW.

r) In the control circuit related to and including auxiliary transistor AQ, there are to main control effects: (i) one associated with the fact that the magnitude of the bias voltage on capacitor Cb tends to vary around an average level as a function of the average absolute magnitude of the inverter's output current, and (ii) one associated with the fact that the average level around which the bias voltage varies may itself be varied, such as by varying the magnitude of the base current provided to auxiliary transistor AQ.

s) Without any substantial loading on the LC circuit, its Q-factor is quite high, and—absent proper control measures—the magnitude of the voltage developing across the tank-capacitor tends to become destructively high.

A large-magnitude voltage across the tank-capacitor must by necessity be associated with an inverter output current of correspondingly large magnitude. However, a large-magnitude inverter output current will cause a correspondingly high-magnitude negative bias on both bias capacitors, but—absent lamp current of magnitude sufficient to place transistor AQ into conduction—particularly on bias capacitor Cb: the two bias capacitors have to provide a positive current of magnitude proportional to the average absolute magnitude of the inverter's output current; which means that the magnitude of the negative bias voltage will have to increase with increasing magnitude of the inverter output current.

It is this negative feedback feature, which relates to negative feedback of the rectified average magnitude of the inverter's output current, that provides for stable controllable operation of a self-oscillating inverter whose output is connected across an unloaded high-Q series-connected LC circuit t) In fact, the circuit arrangement of FIG. 1 may be defined as an inverter that is loaded by way of a high-Q tuned LC circuit and arranged to self-oscillate by way of positive feedback derived from the inverter's instantaneous output current (and/or voltage) while at the same time arranged to provide for controllable-magnitude output current (and/or voltage) by way of negative feedback derived from the average absolute magnitude of the inverter's output current (and/or voltage).

u) With reference to FIG. 2, it is seen that at the moment of turn-off, the magnitude of the reverse-voltage provided at the base of the Qb switching transistor is larger for a larger magnitude of the current flowing through the transistor at the moment the reverse voltage is initially provided.

Thus, we have a situation where the magnitude of the transistor reverse turn-off voltage is increasing with the magnitude of the transistor current at the moment of turn-off; which situation is highly advantageous for efficient switching.

Details of Construction of the Preferred Embodiment of FIG. 3

The ballast arrangement of FIG. 3 is basically the same as that of FIG. 1, except for: (i) an auxiliary tank capacitor AC having been inserted between junction Jc and a junction Jc', which is the junction where one terminal of tank capacitor C connects with one terminal of primary winding PW; (ii) certain differences in the circuitry between bridge rectifier BR and the B−/B+ buses; and (iii) certain differences in the circuitry located between the terminals of capacitor Cb, the terminals of secondary winding SW, junction Jx, and the terminals of secondary winding CW.

For sake of clarity, in the arrangement of FIG. 3 (versus that of FIG. 1), EMI suppression inductor SI has been removed. The DC+ terminal has been connected directly with the B+ bus; the DC− terminal has been connected directly with the B− bus; and a power-factor-correction assembly PFCA has been connected directly between the DC− and DC+ terminals by way of its terminals AT− and AT+, respectively.

Assembly PFCA has an auxiliary terminal AT, which is connected with junction Jc'.

In assembly PFCA, a first energy-storing capacitor ESC1 is connected between terminal AT+ and the anode of a diode D1 as well as with the cathode of a diode D2. The anode of diode D2 is connected with terminal AT−. The cathode of diode D1 is connected with the anode of a diode D3, whose cathode is connected with the AT+ terminal.

A second energy-storing capacitor ESC2 is connected between the cathode of diode D1 and the anode of a diode D4, whose cathode is connected with the anode of a diode D5. The cathode of another diode D6 is connected with the anode of diode D4; and the cathode of diode D5 is connected with the anode of a diode D7, whose cathode is connected with the AT+ terminal.

A third energy-storing capacitor ESC3 is connected between the cathode of diode D5 and the AT− terminal.

A DC blocking capacitor BC is connected between the anode of diode D5 and auxiliary terminal AT.

The circuitry connected between capacitor Cb, secondary winding SW, junction Jx, and secondary winding CW, is described as follows.

A C− bus is connected with junction Jb via a thermal switch means TSM.

A first control transistor Q1 is connected with its emitter to the C− bus and with its collector to the B− bus via a resistor R1. A second control transistor Q2 is connected with its emitter to the C− bus and with its collector to the base of transistor Q1. A third control transistor Q3 is connected with the C− bus and with its collector to the B− bus via a series-combination of a resistor R2 and an adjustable resistor AR.

One of the terminals of the CW winding is connected with the C− bus; the other terminal of the CW winding is connected with the anode of a diode D8. A resistor R3 is connected between the cathode of diode D8 and the base of transistor Q1. A resistor R4 is connected between the cathode of diode D8 and the cathode of a Zener diode ZD. The anode of Zener diode ZD is connected with the base of transistor Q2 via a resistor R5. A resistor R6 is connected between the base of transistor Q2 and the cathode of a diode D9, whose anode is connected with the cathode of a diode D10. A resistor R7 is connected between the cathode of diode D10 and the base of transistor Q3; and a capacitor C1 is connected between the cathode of diode D10 and the C− bus.

The terminals of the SW winding are connected between the anode of diode D10 and the C− bus.

A capacitor C2 is connected between the C− bus and the cathode of a diode D11, whose anode is connected with the anode of diode D8. A resistor R8 and a capacitor C3 are both connected between the cathode of Zener diode ZD and the C− bus.

A fourth control transistor Q4 is connected with its emitter to the C− bus and with its collector to the cathode of Zener diode ZD via a resistor R9.

A resistor R10 is connected between the B− bus and the gate of a programmable unijunction transistor PUT; and a resistor R11 is connected between the cathode of diode D11 and the gate of the PUT. A capacitor C4 is connected between the anode of the PUT and the C− bus; and a resistor R12 is connected between the cathode of diode D11 and the anode of the PUT.

A resistor R13 is connected between the PUT's cathode and the base of transistor Q4; and a resistor R14 is connected between the C− bus and the base of transistor Q4.

The complete control circuit consisting of elements TSM, Q1-Q4, R1-R14, C1-C4, D8-D11, ZD, AR and PUT is designated as control circuit CC.

Details of Operation of the Preferred Embodiment of FIG. 3

The circuit of FIG. 3 operates in a manner similar to that of FIG. 1 except for the following salient differences.

(1) The capacitance values of filter capacitors FCa/FCb have been reduced to a point where they no longer provide significant filtering at 120 Hz, although still providing effective filtering at 30 kHz.

(2) In effect and as more fully explained below, the added power factor correction arrangement PFCA consists of three energy-storing capacitors ESC-1/ESC2/ESC3 of substantially equal capacitance values. These three capacitors are: (i) under certain conditions, whenever the instantaneous magnitude of the DC supply voltage (i.e., the DC voltage present between the B− bus and the B+ bus) is at or near its peak, series-charged directly from this DC supply voltage; (ii) as long as the instantaneous magnitude of the DC voltage is above a first level, charged to a pre-determined degree via a current-limited 30 kHz voltage injected at the AT terminal, which 30 kHz voltage is DC-blocked by capacitor BC and full-wave-rectified by rectifiers D4 and D5, thereby to charge the ESC3 capacitor with a current pulse of a given Columb-magnitude on each positive half-cycle and to series-charge the ESC1/ESC2 capacitors with a current pulse of the same Columb-magnitude on each negative half-cycle; and (iii) whenever the instantaneous magnitude of the DC supply voltage decreases below a second level, parallel-discharged to the B−/B+ buses, thereby to supply operating current to the inverter whenever the instantaneous magnitude of the DC supply voltage is indeed below this second level.

(3) As more fully explained below, compared with the control arrangement of FIG. 1, control circuit CC of FIG. 3 acts to control the magnitude of the inverter's 30 kHz output current via manifest negative feedback provided via a threshold means (Zener diode ZD). Also, in control circuit CC, the magnitude of the lamp current can be controlled in a continuous rather than step-wise manner via a continuously adjustable resistor.

Figure 4:
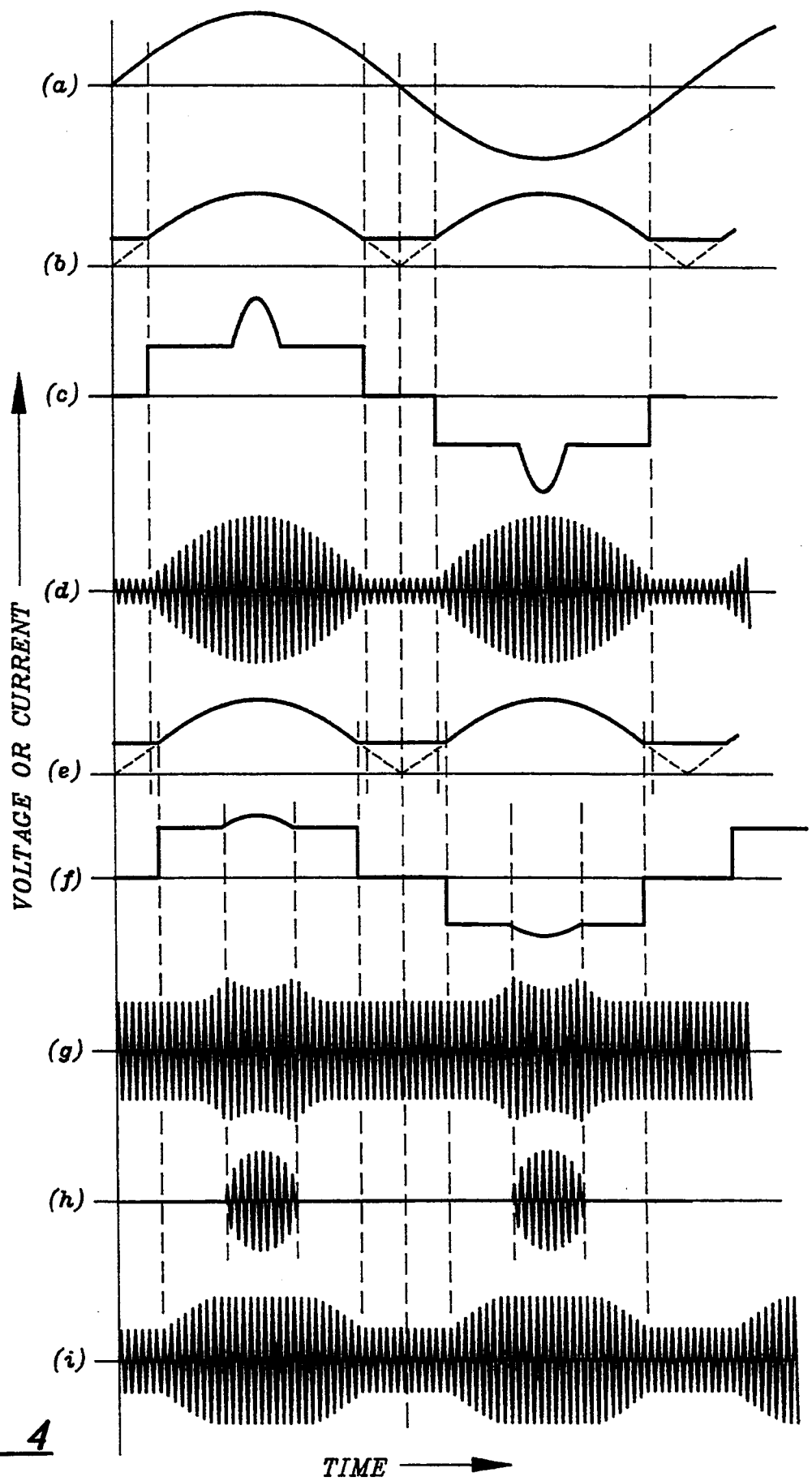
FIG. 4 illustrates various voltage and current waveforms associated with the circuit of FIG. 3.

To aid in understanding the operation of the preferred circuit arrangement of FIG. 3, FIG. 4 depicts various pertinent although somewhat idealized voltage and current waveforms.

FIG. 4a shows the waveform of the power line voltage present at power input terminals PITa/PITb.

FIG. 4b correspondingly shows the instantaneous magnitude of the DC supply voltage for the situation where the capacitance of DC blocking capacitor BC is very low (or even zero), thereby to substantially limit the magnitude of the charging current provided to energy-storing capacitors ESC1/ESC2/ESC3 from the 30 kHz voltage applied to the AT terminal.

FIG. 4c shows the waveshape of the current drawn from the power line under the condition associated with FIG. 4b.

FIG. 4d indicates the waveshape of the current flowing through the fluorescent lamps under the condition associated with FIG. 4b.

FIG. 4e shows the instantaneous magnitude of the DC supply voltage for a situation where all the charging of energy-storing capacitors ESC1/ESC2/ESC3 is accomplished from the 30 kHz voltage applied to the AT terminal.

FIG. 4f shows the waveshape of the current drawn from the power line under the condition associated with FIG. 4e.

FIG. 4g indicates the waveshape of the 30 kHz voltage present across capacitor AC under the condition associated with FIG. 4e.

FIG. 4h indicates the waveshape of the current flowing into the AT terminal under the condition associated with FIG. 4e.

FIG. 4i indicates the waveshape of the current flowing through the fluorescent lamp under the condition associated with FIGS. 4e–h.

More specifically, the power factor correction arrangement PFCA operates as follows.

With reference to FIGS. 4a–c, when there is little or no 30 kHz current provided to terminal AT—as might be due to capacitor AC being relatively large, or capacitor BC being relatively small (or absent)—the three energy-storing capacitors get charged directly by the full-wave-rectified power line voltage. As shown in FIGS. 4a–c, charging takes place at and near the peak absolute magnitude of the power line voltage. That is, whenever the instantaneous magnitude of the DC voltage present between the B− bus and the B+ bus exceeds the sum of the magnitudes of the DC voltages present across the three energy-storing capacitors, these energy-storing capacitors will be charged via diodes D1, D4 and D5. Since the three capacitors are of substantially equal capacitances, the DC voltage across them will be approximately equal in magnitude.

With the charging of capacitors ESC1/ESC2/ESC3 taking place directly from the full-wave-rectified power line voltage as above indicated, the magnitude of the DC voltage on each capacitor will be about one third the peak magnitude of the power line voltage; and the instantaneous magnitude of the resulting DC supply voltage (i.e., the voltage between the B− bus and the B+ bus) will be as indicated by FIG. 4b; while the instantaneous magnitude of the current drawn from the power line will be as indicated by FIG. 4c. The power factor associated with the current waveshape of FIG. 4c is about 92%.

Clearly, during the periods when no current is drawn from the power line, inverter power is provided from the three energy-storing capacitors. In particular, whenever the instantaneous absolute magnitude of the power line voltage decreases below the magnitude of the DC voltage on each capacitor, the three capacitors will—via diodes D2, D3, D6 and D7—automatically commutate so as to discharge themselves in parallel into whatever load is connected between the B− bus and the B+ bus.

With reference to FIG. 4h, when there is a substantial amount of 30 kHz current provided to terminal AT, the three energy-storing capacitors get charged with 30 kHz current pulses; and little or no charging takes place directly from the full-wave-rectified power line voltage. In particular, the three capacitors now receive 30 kHz current pulses via diodes D4/D1 and D5: on each positive half-cycle of the 30 kHz current, capacitor ESC3 gets a charging pulse; and on each negative half-cycle of the 30 kHz current, capacitors ESC1/ESC2 get a charging pulse. Since the 30 kHz current input to terminal AT is capacitively coupled, the magnitudes of the positive charging pulses will be the same as those of the negative charging pulses; which means that, in spite of the apparent lack of symmetry, each one energy-storing capacitor receives the same amount of charge during each complete cycle of the 30 kHz current.

With the energy-storing capacitors being charged by nothing but 30 kHz current, the magnitude of the DC voltage developing across each capacitor will be larger than one third of the peak absolute magnitude of the power line voltage; which is indeed indicated by FIG. 4e. Also, the charging of these energy-storing capacitors will now take place over a longer period, thereby—as indicated in FIG. 4f—giving rise to a basic change in the waveshape of the current drawn from the power line. In fact, the power factor associated with the current waveform of FIG. 4f is about 96%.

Thus, when the energy-storing capacitors are being charged by 30 kHz current, there is a substantial improvement—from 0.92 to 0.96—in the power factor associated with the power drawn from the power line; which improvement translates into a substantial reduction in the harmonic content of the corresponding line current. Also, as may be seen by comparing the lamp current waveform of FIG. 4i with that of FIG. 4d, a significant improvement in lamp current crest factor results. Particularly, the crest factor associated with the lamp current waveform of FIG. 4d is about 1.8, which is higher than the 1.7 crest factor normally considered maximally acceptable. On the other hand, the crest factor associated with the waveform of FIG. 4i is about 1.65.

The operation of control circuit CC may be explained as follows.

Basically, in response to various inputs, control circuit CC operates in such manner as to control the magnitude of the voltage present across capacitor Cb: the larger the magnitude of the negative voltage at junction Jb, the shorter the ON-time of transistor Qb, and the less the amount of energy imparted to the LC circuit each cycle.

More particularly, since at normal operating temperatures thermal switch means TSM is a short circuit, if transistor Q1 is conducting, charge on capacitor Cb is leaked off through resistor R1. Or, if transistor Q3 is conducting, charge on capacitor Cb is leaked off through resistors R2 and AR.

Before lamp ignition: (i) transistor Q3 is OFF (i.e., non-conducting) for the reason that no current flows through the lamps, which means that no output is provided from lamp-current-sensing-transformer LCST; and (ii) transistor Q1 is ON (i.e., conducts) every positive half-cycle of the 30 kHz voltage provided from the CW winding, which 30 kHz voltage is half-wave-rectified by diode D8 and applied to the base of transistor Q1 via resistor R3.

However, as the magnitude of the voltage provided from winding CW increases, a point is reached where the magnitude of the half-wave-rectified voltage provided via diode D8 is so high as to cause Zener diode ZD to conduct; thereby to provide current to the base of transistor Q2; thereby—in turn—to cause transistor Q2 to turn ON; thereby, in turn, to starve the base of transistor Q1; thereby, in turn, to reduce the degree to which transistor Q1 is turned ON. In other words, by negative feedback, the base of transistor Q1 will be starved exactly to the degree required to cause the Zener diode ZD to conduct slightly; which, in turn, means that the magnitude of the 30 kHz voltage present across winding CW will be approximately determined by the Zenering-voltage of Zener diode ZD as combined with the voltage division represented by resistors R4 and R8, assuming transistor Q4 to be OFF.

Whenever transistor Q4 is ON—which, by action of the PUT and its associated circuitry, occurs for a period of 10-20 milli-seconds once each second—resistor R8 gets parallel-connected with resistor R9; which means that during these 10-20 milli-seconds the magnitude of the 30 kHz voltage provided across winding CW gets regulated to a higher level than otherwise.

Of course, regulating the magnitude of the 30 kHz voltage developing across winding CW is substantially equivalent to regulating the magnitude of the 30 kHz voltage developed across tank inductor L; which, in turn, is essentially equivalent to regulating the magnitude of the 30 kHz voltage developing across tank capacitor C.

In particular, before the lamps have ignited, the magnitude of the voltage provided across output terminals POT1 and POT2 (i.e., across the lamps) is regulated to a first relatively low level (approximately 250 Volt RMS) during most of the time; but for 10-20 milli-seconds each second or so, the magnitude of this 30 kHz output voltage is regulated to a second relatively high level (about 450 Volt RMS).

After the lamp cathodes have been heated for one second or so, the lamps will ignite during the 10-20 milli-second period of relatively high output voltage. Thereafter, lamp current will flow; which, in turn, will cause transistor Q3 to turn ON while at the same time—via transistor Q2—cause transistor Q1 to turn OFF. Thus, after the lamps have ignited, transistor Q1 is removed from the circuit; and control now takes place by way of transistor Q3; which, as long as lamp current is indeed flowing, is substantially fully turned ON.

With transistor Q3 fully ON, the degree of charge leak-off from capacitor Cb is determined by resistors R2 and AR: the lower the combined resistance, the higher the magnitude of the lamp current. With AR set to its minimum resistance, maximum-magnitude lamp current occurs; with AR set to its maximum resistance, minimum-magnitude lamp current occurs.

Additional Comments re FIG. 3 Circuit (aa) Thermal switch means TSM is a device so designed that it will change from being substantially a short circuit to being substantially an open circuit at a pre-determined temperature, such as typically 90 degrees Celsius.

After the thermal switch means has opened, the lamps will lose power and the inverter circuit will cease to draw substantial power from the power line. Thus, the ballast will not contribute to any further increase in the heating that caused the thermal switch means to open in the first place.

Since it is located in the control circuit, the contact rating of the thermal switch means can be very modest as compared with the ratings that would be required if it were located in the main power supply circuit, as is usual practice.

(ab) Under normal ballast operation and without being connected with terminals AT, the voltage across capacitor AC (at junction Jc') is substantially a constant-magnitude sinusoidal 30 kHz voltage. However, the magnitude of the current available from junction Jc' is limited to the (quadratic) sum of the current flowing through tank capacitor C and the current flowing through the lamps.

By choice of capacitor AC, the open circuit 30 kHz voltage present across capacitor AC is arranged to have an open-circuit magnitude slightly lower than one third of the peak magnitude of the DC supply voltage; which, with a 277 Volt power line voltage, will be about 130 Volt. As a result, no charging of the energy-storing capacitors will take place whenever the inverter is being powered from these energy-storing capacitors; and only after the absolute magnitude of the power line voltage rises above one third of its peak value will the energy-storing capacitors be charged.

With reference to FIG. 4g, the more the absolute magnitude of the power line voltage rises above about one third its peak value, the more 30 kHz charging current will be provided. At the very peak of the power line voltage, as long as the capacitance of blocking capacitor BC is sufficiently high, input terminal AT represents a near short circuit to the 30 kHz current provided from junction Jc'; which means that, at that particular point, the energy-storing capacitors are being charged with the full amplitude of the current flowing through the parallel-combination of tank capacitor C and lamps FL1/FL2.

(ac) DC blocking capacitor BC may be altogether eliminated if a DC isolation capacitor is placed in series with the fluorescent lamp.

In fact, to mitigate the possibility of having a significant degree of 120 Hz ground-fault current, it is advantageous in any case to place a low-frequency blocking capacitor in series with fluorescent lamps FL1/FL2. In particular, this low-frequency blocking capacitor could conveniently be inserted between junction Jy and power output terminals POT2.

(ad) It is important to realize that even though the magnitude of the high-frequency voltage present across auxiliary capacitor AC is approximately constant, charging of energy-storing capacitors ESC1/ESC2/ESC3 takes place only during periods what the instantaneous absolute magnitude of the DC supply voltage (i.e., the DC voltage present between the B− bus and the B+ bus) is above a certain level. This is so for the reason that —from a fixed-magnitude high-frequency voltage—charging can only occur whenever the (DC) potential at the anode of diode D4 not more negative than the (DC) potential at the cathode of diode D5 by more than the peak magnitude of the high-frequency charging voltage (i.e., the voltage across auxiliary capacitor AC).

For instance, when the magnitude of the DC supply voltage is substantially equal to the magnitude of the DC voltage across each of the energy-storing capacitors, a situation exists where the potential of the cathode of diode D5 is approximately equal to the potential of the B+ bus, while the potential of the anode of diode D4 is substantially equal to the potential of the B− bus; which means that—before charging would take place—the magnitude of the charging voltage would have to have a peak magnitude sufficiently larger to overcome the substantial back-biasing of diodes D4/D5.

(ae) In the circuit of FIG. 3, resistor R13 is used for limiting the rate of discharge of capacitor C4. In some situations, it is advantageous to place this resistor directly in series with energy-storing capacitor C4: on the anode-side of the PUT as opposed to the cathode-side.

(af) The lamp current waveform of FIG. 4i is shown as having an envelope with a substantially flat or horizontal top. In reality, with the energy-storing capacitors being of finite capacitance such as to cause the DC voltage across each them to vary somewhat as they are being charged, there is a slight positive slope to the top of the envelope portion.

(ag) The voltage waveform of FIG. 4g represents only the 30 kHz component of the voltage present across capacitor AC. In reality, the voltage across capacitor AC also has a substantial 120 Hz component.

(ah) In comparison with the waveform of FIG. 4d, where no energy is fed back from the high frequency output circuit to the energy-storing capacitors, the improved crest-factor waveform of FIG. 4i depicts a situation where energy is intermittently fed back from the high frequency output circuit to the energy-storing capacitors. In effect, this energy feedback—which is represented by the bursts of current depicted by FIG. 4h—is "stolen" from the lamp; which is why, when the lamp current otherwise would reach a peak (as in FIG. 4d), the amplitude of the high frequency lamp current in the arrangement associated with FIG. 4i remains substantially constant for as long as energy is indeed being "stolen" from the lamp.

(ai) It is noted that the term crest-factor simply pertains to the ratio of the peak magnitude to thr RMS magnitude of any waveform. Thus, a sinewave has a crest-factor of 1.4, as does a full-wave-rectified sinewave. The waveform of FIG. 4b has a crest factor of about 1.3; and the waveform of FIG. 4e has a crest-factor of between 1.3 and 1.4. The crest-factor of the amplitude-modulation of the high frequency lamp current of FIG. 4d is also between 1.3 and 1.4; whereas the crest-factor of the amplitude-modulation of the high frequency lamp current of FIG. 4i is about 1.2. The total crest-factor of the lamp-current of FIG. 4i is slightly under 1.7; which level represents the maximum lamp current crest-factor normally allowed under the standards of the lighting industry.

(aj) In reality, the horizontal constant-magnitude parts of the waveforms of FIGS. 4b and 4e are drooping slightly down for the reason that the capacitance of each of the energy-storing capacitors is not infinitely large.

Likewise, due to the fact that the magnitude of the DC voltage on each of the energy-storing capacitors does not remain constant while being charged (i.e., during the current bursts of FIG. 4h), the amount of energy "stolen" from the lamp becomes non-symmetrical with respect to the peak of the charging bursts. For that reason, the upper flat portion of the envelope of the lamp current of FIG. 4i is in reality not totally horizontal, but has a slight slope.

(ak) The magnitude-modulation on the DC supply voltage of FIG. 4e gives rise to the periodic coupling and un-coupling of the energy-storing capacitors from the high frequency charging circuit. In effect, the charging circuit gets connected only during periods when the magnitude of the DC supply voltage is higher than a certain preset level; which level, in the arrangement associated with FIG. 4h, corresponds to the middle fifth of each modulation-cycle of the DC supply voltage.

(al) The harmonic distortion of a periodic wave is the ratio between the RMS magnitude of the fundamental frequency component and the RMS magnitude of the sum of all the remaining (higher) frequency components.

(am) It is believed that the present invention and its several attendant advantages and features will be understood from the preceeding description. However, without departing from the spirit of the invention, changes may be made in its form and in the construction and interrelationships of its component parts, the from herein presented merely representing the presently preferred embodiment.

What is claimed is:

1. An arrangement comprising:

rectifier means connected with the AC voltage of an ordinary electric utility power line and operative to provide a unidirectional current to a pair of DC terminals; there existing a DC voltage across the DC terminals; the instantaneous absolute magnitude of the DC voltage being substantially equal to the larger of: (i) the instantaneous absolute magnitude of the AC voltage, and (ii) a constant absolute magnitude that is lower than the peak absolute magnitude of the AC voltage;

inverter means connected with the DC terminals and operative to provide a high-frequency voltage at an inverter output; the high-frequency voltage: (i) being of substantially constant frequency; (ii) being of frequency substantially higher than that of the AC voltage, and (iii) having a first amplitude-modulation; the first amplitude-modulation being characterized by having a first crest-factor;

lamp means having lamp terminals; and control means connected in circuit with the lamp terminals, the rectifier means, and the inverter means; the control means being operative to cause a high-frequency lamp current to flow through the lamp means; the high-frequency lamp current being of frequency substantially higher than that of the AC voltage and having a second amplitude-modulation; the second amplitude-modulation being characterized by a having second crest-factor; the second crest-factor being substantially smaller than the first crest-factor.

2. The arrangement of claim 1 wherein: (i) the first crest-factor is higher than a certain number that is approximately equal to 1.3; and (ii) the second crest-factor is lower than said certain number.

3. The arrangement of claim 1 wherein said constant absolute magnitude is lower than half of the peak absolute magnitude of the AC voltage.

4. The arrangement of claim 1 wherein the control means includes two energy-storing capacitors; each energy-storing capacitor having a unidirectional voltage across its terminals; the absolute magnitude of this unidirectional voltage being substantially constant and about equal to said constant absolute magnitude.

5. The arrangement of claim 1 wherein the control means includes a tuned LC circuit; the LC circuit being resonant at or near the frequency of the high-frequency voltage.

6. An arrangement comprising:

rectifier means connected with the AC voltage of an ordinary electric utility power line and operative to provide a unidirectional current to a pair of DC terminals; there existing a DC voltage across the DC terminals; the DC voltage having a first amplitude-modulation; the first amplitude-modulation being characterized by having a first crest-factor;

inverter means connected with the DC terminals and operative to provide a high-frequency voltage at an inverter output; the high-frequency voltage: (i) being of substantially constant frequency; (ii) being of frequency substantially higher than that of the AC voltage, and (iii) having a second amplitude-modulation; the second amplitude-modulation being characterized by having a second crest-factor;

lamp means having lamp terminals; and control means connected in circuit with the lamp terminals, the inverter means, and the rectifier means; the control means being operative to cause a high-frequency lamp current to flow through the lamp means; the high-frequency lamp current being of frequency substantially higher than that of the AC voltage and having a third amplitude-modulation; the third amplitude-modulation being characterized by having a third crest-factor; the third crest-factor being substantively smaller than the second crest-factor.

7. The arrangement of claim 6 wherein the second crest-factor is approximately equal to the first crest-factor.

8. The arrangement of claim 6 wherein the lamp means includes a gas discharge lamp.

9. A combination comprising:

DC supply means operative to provide a DC voltage having a first amplitude-modulation; the first amplitude-modulation being characterized by being of a relatively low frequency and by having a first crest-factor;

lamp means having lamp terminals; and conversion means connected in circuit with the DC supply means as well as with the lamp means; the conversion means being operative to cause a lamp current to flow through the lamp means; the lamp current being of relatively high substantially constant frequency and having a second amplitude-modulation; the second amplitude-modulation being characterized by being of the relatively low frequency and by having a second crest-factor; the second crest-factor being manifestly lower than the first crest-factor.

10. An arrangement comprising:

a AC source providing an AC voltage at a set of AC terminals;

DC supply means connected with the AC terminals and operative to provide a DC current to a set of DC terminals; there being a DC voltage present at the DC terminals; the DC supply means having energy-storing means and drawing an AC current from the AC source; the AC current being characterized by having a fundamental component having a fundamental frequency and a harmonic component having harmonic frequencies; the fundamental component being characterized by a first RMS magnitude; the harmonic component being characterized by a second RMS magnitude; the ratio between the second RMS magnitude and the first RMS magnitude being a measure of harmonic distortion of the AC current;

lamp means having lamp terminals;

conditioning means connected in circuit with the DC supply means and the lamp means; the conditioning means being operative: (i) to cause a lamp current to flow through the lamp means, and (ii) to draw energy from the energy-storing means; the lamp current being of a fundamental frequency substantially higher than any of said harmonic frequencies; the lamp current having amplitude-modulation; the amplitude-modulation being characterized by a lamp current crest-factor; and feedback means connected in circuit between the conditioning means and the DC supply means; the feedback means being operative, during certain periods, to provide feedback of energy from the conditioning means to the energy-storing means such as to cause, in comparison with a situation where such feedback is absent, a reduction of the lamp current crest-factor as well as a reduction of the harmonic distortion of the AC current.

11. The arrangement of claim 10 wherein the energy-storing means includes a first and a second energy-storing capacitor; the first energy-storing capacitor being of approximately the same capacitance as the second energy-storing capacitor.

12. The arrangement of claim 10 wherein the DC voltage has a DC crest-factor that is manifestly higher than 1.2.

13. The arrangement of claim 12 wherein the lamp current crest-factor is substantially lower than the DC crest-factor.

14. A combination comprising:

DC supply means operative to provide a DC voltage having a first amplitude-modulation; the first amplitude-modulation being characterized by being of relatively low frequency and by having a first crest-factor;

gas discharge lamp means having lamp terminals; and conditioning means connected in circuit with the DC supply means as well as with the lamp means; the conditioning means causing the flow of relatively high substantially constant frequency lamp current having a second amplitude-modulation; the second amplitude-modulation being being of the relatively low frequency and having a second crest-factor; the second crest-factor being substantially lower than the first crest-factor.

15. An arrangement comprising:

rectifier means connected with the AC voltage of an ordinary electric utility power line and operative to provide a unidirectional current to a pair of DC terminals; there existing a DC voltage across the DC terminals; the instantaneous magnitude of the DC voltage being the larger of: (i) the instantaneous absolute magnitude of the AC voltage, and (ii) a constant absolute magnitude that is lower than the peak absolute magnitude of the AC voltage; the rectifier means including at least two energy-storing capacitors being: (i) at certain times during each cycle of the AC voltage charged in series with current supplied from the DC terminals; and (ii) at certain other times during each cycle of the AC voltage discharged in parallel by supplying current to the DC terminals; the DC voltage having a first amplitude-modulation; the first amplitude-modulation being characterized by having a first crest-factor;
inverter means connected with the DC terminals and operative to provide a high-frequency voltage at an inverter output; the high-frequency voltage being of frequency substantially higher than that of the AC voltage and having a second amplitude-modulation; the second amplitude-modulation being characterized by having a second crest-factor; and
lamp means having lamp terminals;
the arrangement being interconnected and functional such as to cause a high-frequency lamp current being of frequency substantially higher than that of the AC voltage and having a third amplitude-modulation; the third amplitude-modulation being characterized by having a third crest-factor; the third crest-factor being no higher than the second crest-factor.

16. An arrangement comprising:
rectifier means connected with the AC voltage of an ordinary electric utility power line and operative to provide a unidirectional current to a pair of DC terminals; there existing a DC voltage across the DC terminals; the instantaneous absolute magnitude of the DC voltage being substantially equal to the larger of: (i) the instantaneous absolute magnitude of the AC voltage, and (ii) a substantially constant absolute magnitude that is lower than the peak absolute magnitude of the AC voltage; the rectifier means including at least two energy-storing capacitors; the two energy-storing capacitors being: (i) during a part of each half-cycle of the AC voltage, charged in series by current supplied from the DC terminals; and (ii) during another part of each half-cycle of the AC voltage, discharged in parallel by supplying current to the DC terminals;
inverter means connected with the DC terminals and operative to provide a high-frequency voltage at an inverter output; the high-frequency voltage being of frequency substantially higher than that of the AC voltage and having a first amplitude-modulation; the first amplitude-modulation being characterized by having a first crest-factor; and
lamp means having lamp terminals.

17. An arrangement comprising:
rectifier means connected with the AC voltage of an ordinary electric utility power line and operative to provide a unidirectional current to a pair of DC terminals; there existing a DC voltage across the DC terminals; the instantaneous absolute magnitude of the DC voltage being substantially equal to the larger of: (i) the instantaneous absolute magnitude of the AC voltage, and (ii) a substantially constant absolute magnitude that is lower than the peak absolute magnitude of the AC voltage; the rectifier means including at least two energy-storing capacitors; the two energy-storing capacitors being: (i) during a part of each half-cycle of the AC voltage, charged in series by current supplied from the DC terminals; and (ii) during another part of each half-cycle of the AC voltage, discharged in parallel by supplying current to the DC terminals;
inverter means connected with the DC terminals and operative to provide a high-frequency voltage at an inverter output; the high-frequency voltage being of frequency substantially higher than that of the AC voltage; and
lamp means having lamp terminals connected in circuit with the inverter output.

18. An arrangement comprising:
a rectifier and filter circuit connected with the AC voltage of an ordinary electric utility power line and operative to provide a unidirectional current to a pair of DC terminals; there existing a DC voltage across the DC terminals; the instantaneous absolute magnitude of the DC voltage being substantially equal to the larger of: (i) the instantaneous absolute magnitude of the AC voltage, and (ii) a substantially constant absolute magnitude that is higher than zero magnitude but lower than the peak absolute magnitude of the AC voltage; the rectifier and filter circuit including at least two energy-storing capacitors; the two energy-storing capacitors being: (i) during a part of each half-cycle of the AC voltage, charged in series by current supplied from the DC terminals; and (ii) during another part of each half-cycle of the AC voltage, discharged in parallel by supplying current to the DC terminals;
inverter means connected with the DC terminals and operative to provide a high-frequency voltage at an inverter output; the high-frequency voltage being of frequency substantially higher than that of the AC voltage; and
lamp means having lamp terminals connected in circuit with the inverter output.

19. A combination comprising:
DC supply means operative to provide a DC voltage at pair of DC terminals; the DC voltage being characterized by having an absolute magnitude that varies periodically at a relatively low frequency between a minimum voltage level and a maximum voltage level; the maximum voltage level being larger than the minimum voltage level by a first ratio;
lamp means having lamp terminals; and
an inverter circuit assembly connected between the DC terminals and the lamp terminals; the inverter circuit assembly being operative to cause a lamp current to flow through the lamp means; the lamp current: (i) being of relatively high and substantially constant frequency, and (ii) having an envelope characterized by varying at the relatively low frequency between a minimum current level and a maximum current level; the maximum current level being higher than the minimum current level by a second ratio; the second ratio being substantively smaller than the first ratio.

20. A combination comprising:
DC supply means operative to provide a DC voltage being amplitude-modulated by a first percentage at a relatively low frequency;
gas discharge lamp means having lamp terminals; and
conditioning means connected in circuit with the DC supply means as well as with the lamp means; the conditioning means causing a relatively high frequency lamp current to flow through the lamp means; the lamp current: (i) being of a substantially constant frequency, and (ii) being amplitude-modulated by a second percentage at the relatively low frequency; the relatively high frequency being substantially higher than the relatively low frequency; the first percentage being substantively higher than the second percentage.

* * * * *